United States Patent [19]

Enomoto

[11] Patent Number: 6,153,683

[45] Date of Patent: Nov. 28, 2000

[54] GLASS LONG FIBER-REINFORCED THERMOPLASTIC RESIN FORM HAVING CONDUCTIVITY AND MANUFACTURING METHOD THEREOF

[75] Inventor: Norihide Enomoto, Chiba, Japan

[73] Assignee: Kawasaki Steel Corporation, Tokyo, Japan

[21] Appl. No.: 09/113,726

[22] Filed: Jul. 10, 1998

Related U.S. Application Data

[63] Continuation of application No. PCT/JP97/04137, Nov. 13, 1997.

[51] Int. Cl.[7] .................................................. C08K 3/00
[52] U.S. Cl. ............................ 524/494; 524/495; 524/496
[58] Field of Search .................................... 524/494, 495, 524/496

[56] References Cited

U.S. PATENT DOCUMENTS

| 5,004,561 | 4/1991 | Nomura et al. ...................... 252/511 |
| 5,409,968 | 4/1995 | Clatanoff et al. ..................... 523/204 |

FOREIGN PATENT DOCUMENTS

| 59-23595 | 2/1984 | Japan . |
| 60-18315 | 1/1985 | Japan . |
| 60-88064 | 5/1985 | Japan . |
| 62-132959 | 6/1987 | Japan . |
| 62-36090 | 8/1987 | Japan . |
| 4-68348 | 11/1992 | Japan . |
| 5-55961 | 8/1993 | Japan . |

*Primary Examiner*—Edward J. Cain
*Attorney, Agent, or Firm*—Akin, Gump, Strauss, Hauer & Feld, L.L.P.

[57] ABSTRACT

The present invention provides a thermoplastic resin formed product containing glass fiber having a length of at least 0.4 mm in an amount within a range of from 5 to 60 wt. % and at least a kind of conductive material in an amount within a range satisfying the following formula (1):

$$0.25 \leq \sum_{k=1}^{k=n} \left\{ \frac{W_k}{|\log E_k|} \right\} \leq 50 \quad \text{Formula (1)}$$

where, $W_k$ is the content in weight of each conductive material (%), $E_k$ is volume resistivity of each conductive material ($\Omega \cdot cm$), and n is the number of kinds of conductive material.

Further, the present invention provides also a method of manufacturing a thermoplastic resin formed product, comprising the step of forming a thermoplastic resin containing glass fiber having a weight average fiber length of at least 1 mm in an amount within a range of from 10 to 90 wt. %, in which the glass fiber is substantially impregnated with the resin, and a material containing at least one conductive material, while mixing the same or after mixing the same.

15 Claims, No Drawings

GLASS LONG FIBER-REINFORCED THERMOPLASTIC RESIN FORM HAVING CONDUCTIVITY AND MANUFACTURING METHOD THEREOF

CROSS-REFERENCE TO RELATED APPLICATION

This application is a continuation of PCT/JP97/04137, filed Nov. 13, 1997.

BACKGROUND OF THE INVENTION

1. Technical Field

The present invention relates to a high-strength conductive thermoplastic resin formed product comprising a composite mixture of long glass fibers, a conductive material and a thermoplastic resin and a manufacturing method thereof.

The fiber-reinforced conductive thermoplastic resin formed product (high-strength conductive thermoplastic resin formed product) of the present invention is suitably applicable particularly for an electrostatic scattering material or an electromagnetic wave shielding (EMI shielding) material.

2. Background Art

A conductive thermoplastic resin comprising a composite mixture of a thermoplastic resin with a conductive material can be formed into various complicated shapes by injection molding or injection-compression molding, and further, has such advantages as a low forming cost and possibility of mass production. In the field of conductive materials such as electrostatic scattering materials and electromagnetic wave shielding materials, therefore, conductive thermoplastic resins have now been popularly used in place of fabricated metal articles and conductive surface-fabricated articles treated with a conductive coating material or metal plating. However, these conductive thermoplastic resins had a defect of a low mechanical strength, in spite of the industrial advantages including the wide industrial applicability and the low cost as described above.

More recently, possibility of improving strength of conductive thermoplastic resins, and inventions of adding fibers reinforcing materials such as glass fiber have been proposed. However, strength of a formed product is seriously affected by the remaining fiber length after forming. Even when such a resin reinforced with long fibers longer than 1 mm issued as used as a raw material, therefore, reinforcing fibers are broken during the forming fabrication step, resulting in that most of the long fibers becoming short ones shorter than 0.2 mm, and a remarkable reinforcing effect is unavailable. Measures so far taken to improve strength of resin formed product with conventional glass fibers cannot therefore be sufficient for the purpose.

Now, prior art will be described with reference to some concrete examples.

Japanese Unexamined Patent publication No. 63-90,564 proposes a resin composition comprising a blend of a thermoplastic resin, a stainless steel fiber, and a glass fiber. In this invention, a glass fiber having a diameter within a range of from 5 to 50 $\mu$m and an aspect ratio within a range of from 50 to 500 is used, and the glass fiber length corresponds to a range of from 0.25 to 25 mm. Even when the glass fiber of such a length is used, preparation of pellets for injection molding through melting and kneading of the aforesaid blend in an extruder causes the glass fibers to be broken during the extruding step into short fibers. The above patent publication proposes also a method of converting glass fibers into pellets with the use of a converging agent and using such pellets as they are for injection molding. In this method, the glass fibers are opened by an inline screw of the injection molding machine upon melting and kneading, and dispersed in the molten resin. At this point, however, shearing by the non-molten resin or the screw occurs, resulting in conversion of the long glass fibers into short ones.

Japanese Unexamined Patent Publication No. 60-18,315 proposes a conductive forming material prepared by bundling conductive fibers and inorganic fibers (glass fibers), forming a resin layer on the surface thereof, and then cutting into pellets. When conducting injection molding with the use of this material, the resin is only that formed on the surface of fiber bundle, and the glass fibers are not impregnated with a resin. Glass fibers are broken under the effect of friction between fibers or shearing by non-molten resin or the screw into short fibers.

Similarly, in Japanese Unexamined Patent Publication No. 59-23,595, Japanese Examined Patent Publication No. 62-36,090, Japanese Unexamined Patent Publication No. 60-88,064, Japanese Examined Patent Publication No. 4-68,348, Japanese Unexamined Patent Publication No. 62-132,959, or Japanese Examined Patent Publication No. 5-55,961, while glass fiber is used as a component for improving strength, melting and kneading carried out on a biaxial or uniaxial extruder during pelletizing step break the glass fibers into short ones.

As described above, it has been the conventional practice, taking account of uniform dispersion in the resin formed product, to melt and knead a composition comprising a conductive material, a thermoplastic resin and glass fibers in an extruder to produce pellets of such a composition. In this process, glass fibers are reduced in length into short fibers, and mechanical strength becomes insufficient. Or, in a method of coating the surface of a fiber bundle including glass fibers with a converging agent or a thermoplastic resin, even when a blended mixture of a thermoplastic resin, a conductive material and glass fiber bundle made by the aforesaid method is used as it is as a material for injection molding, friction between glass fibers and shearing force caused by non-molten resin or the screw break the glass fibers into short fibers, resulting in an insufficient mechanical strength.

With a view to preventing the fibers from being broken into short ones, a conceivable counter-measure is to inhibit breakage of the glass fibers during melting and kneading step such as forming.

More specifically, in general, this would be achieved by developing an improved forming apparatus and acting on forming conditions. When adopting the injection molding process for forming fabrication, for example, a conceivable measure is to develop an improved forming apparatus in which the screw design is changed into a deep-threaded one and a reduced compression ratio is used. Forming conditions for maintaining the glass fiber length include a reduced number of revolutions of the screw, a smaller shearing force, and a reduced back pressure.

The present inventors tried to develop a conductive high-strength thermoplastic resin formed product by combining these measures. As a result, although breakage of glass fibers was inhibited and long fibers tended to be maintained, a reduced kneadability resulted in insufficient dispersion of the glass fibers and the conductive material in the formed product. Accordingly, the resultant formed product had non-uniform strength, not exhibiting a uniform conductivity, and fatal defects as a formed product were observed.

From the point of view of imparting conductivity, and also of maintaining energizing channels by the conductive material and preventing occurrence of electric strain, it is important that the conductive material should be uniformly dispersed throughout the thermoplastic resin formed product. For this purpose, kneading dispersion upon forming or during preparation of the raw materials for forming would be enhanced, but breakage of reinforcing fibers occurs at this point. It is needless to mention that uniform dispersion in the thermoplastic resin formed product is important also for the reinforcing fibers from the point of view of strength. However, maintenance of long fibers upon which mechanical strength of the formed product depends, particularly long fibers longer than about 0.4 mm could never be achieved in the conventional art. Particularly, a conductive glass-fiber-reinforced thermoplastic resin formed product, available by the injection molding process or the injection-compression molding process, which contains long glass fibers longer than 0.4 mm as available in the present invention in a prescribed amount, and has both a high strength and electric conductivity, has not as yet been available.

SUMMARY OF THE INVENTION

As a result of extensive studies carried out to find a method for uniformly dispersing long fibers serving as reinforcing glass fibers, together with a conductive material, in a thermoplastic resin while inhibiting breakage thereof, the present inventors developed a novel conductive high-strength thermoplastic resin formed product.

The present inventors noted the defect in the conventional art in that friction between glass fibers caused breakage thereof during forming. Then, to avoid this inconvenience, they reached the present invention by using resin pellets containing long glass fibers in which glass fibers were sufficiently impregnated with the resin, i.e., sufficiently wetted by the resin.

More specifically, their findings are that, by impregnating the glass fibers with the resin, it is possible to reduce friction between glass fibers during melting and kneading, and even when shearing force is active, a shift of resin present between the glass fibers absorbs the shearing energy, thus permitting inhibition of breakage of the glass fibers. As a result, even after forming, breakage of glass fibers was inhibited, with an increased remaining ratio of long fibers in the formed product, and the present inventors successfully developed a high-strength conductive thermoplastic resin formed product. Analysis of the resultant formed product revealed that, among the long glass fibers in the formed product, the amount of remaining fibers longer than 0.4 mm largely contributed to mechanical strength of the formed product.

More particularly, the present invention provides a thermoplastic resin formed product containing glass fiber having a length of at least 0.4 mm in an amount within a range of from 5 to 60 wt. % and at least a kind of conductive material in an amount within a range satisfying the following formula (1):

$$0.25 \leq \sum_{k=1}^{k=n} \left\{ \frac{W_k}{|\log E_k|} \right\} \leq 50 \quad \text{Formula (1)}$$

where, $W_k$ is the content in weight of each conductive material (%); $E_k$ is volume resistivity of each conductive material ($\Omega \cdot cm$), and n is the number of kinds of conductive material.

In the aforesaid thermoplastic resin formed product, the thermoplastic resin should preferably be at least one selected from the group consisting of polyolefin resin, polyamide resin, polystyrene resin and ABS resin.

Further, in the foregoing thermoplastic resin formed product, the conductive material should preferably be at least one selected from the group consisting of carbon black, carbon fiber, stainless steel fiber and copper fiber, and when the conductive material is carbon black, it should preferably be contained in an amount within a range of from 5 to 40 wt. % in the formed product.

In the foregoing thermoplastic resin formed product, the glass fiber should preferably be coupling-treated, and have a diameter within a range of from 5 to 35 μm.

Further, in the foregoing thermoplastic resin formed product, the lower limit value of the formula (1) should preferably be 1.0, and the upper limit value thereof, 30.

In any of the foregoing thermoplastic resin formed products, the formed product should preferably be obtained by the injection molding process or the injection-compression molding process.

Further, the present invention provides a method of manufacturing a thermoplastic resin formed product, comprising the step of forming a thermoplastic resin (A) containing glass fiber having a weight average fiber length of at least 1 mm in an amount within a range of from 10 to 90 wt. %, in which the glass fiber is substantially impregnated with the resin, and a material containing at least one conductive material, while mixing the same or after mixing the same.

In the aforesaid method of manufacturing a thermoplastic resin formed product, the material containing at least one conductive material should preferably be a thermoplastic resin (B) containing at least one conductive material.

In the foregoing method of manufacturing a thermoplastic resin formed product, the thermoplastic resin (A) containing glass fiber should preferably comprise pellets having a length within a range of from 2 to 150 mm available by impregnating glass fiber bundles with the thermoplastic resin and cutting the same, and the glass fiber should preferably have substantially the same length as that of the pellets in which the fibers are arranged substantially in parallel with each other; and the material containing at least one conductive material should preferably be a thermoplastic resin (B) containing at least one conductive material.

Further, in the foregoing method of manufacturing a thermoplastic resin formed product, the thermoplastic resin should preferably be at least one selected from the group consisting of polyolefin resin, polyamide resin, polystyrene resin and ABS resin.

In the foregoing method of manufacturing a thermoplastic resin formed product, the conductive material should preferably be at least one selected from the group consisting of carbon black, carbon fiber, stainless steel fiber and copper fiber.

In the foregoing method of manufacturing a thermoplastic resin formed product, the glass fiber should preferably be coupling-treated, and have a diameter within a range of from 5 to 35 μm.

Further, in the foregoing method of manufacturing a thermoplastic resin formed product, the forming should preferably be accomplished by the injection molding process or by the injection-compression molding process.

DETAILED DESCRIPTION OF INVENTION

The present invention will now be described further in detail below.

(Kind of glass fiber)

The glass fiber used in the invention is prepared by the use of E-glass, S-glass, AR-glass, T-glass, D-glass and R-glass, and the suitable glass fiber diameter is within a range of from 5 to 35 µm. With the same glass content, a diameter of under 5 µm causes a relative increase in the number of glass fibers and causes the glass fibers to be wetted by the resin, hence makes it difficult to impregnate the glass fibers with the resin. A diameter of over 35 µm results in a serious deterioration of the surface exterior view of the formed product. The most suitable range of the glass fibers is from 9 to 20 µm. In this area where a thermoplastic resin is reinforced with glass fibers in a composite form, fibers having a length of about 0.2 mm are generally called long fibers, and shorter ones are called short fibers.

The glass fiber used in the invention should preferably be surface-treated with a surface treatment agent containing a coupling agent. Particularly when a polyolefin resin is used as a thermoplastic resin in a composite form, for example, for polypropylene, the glass surface should preferably be treated with a coupling agent for improving strength of a polypropylene resin formed product because polypropylene resin has only a low adhesion with glass.

There is no particular restriction on the coupling agent. It suffices to select an appropriate one, taking account of the fact that the effect varies with the surface condition of glass or the kind of thermoplastic resin. In general, a silane-based coupling agent, a titanate-based coupling agent or a mixture thereof is applicable. Applicable silane-based coupling agents include aminosilane, epoxysilane, amidesilane, azidesilane and acrylsilane.

Among others, use of aminosilane and epoxysilane is particularly preferable, and aminosilane coupling agent is more preferable.

(Kind of thermoplastic resin)

There is no particular restriction on the kind of thermoplastic resin used in the invention. When using a polyolefin resin or a crystalline resin as polyamide resin such as syndiotactic polystyrene, 6-nylon or 6,6-nylon, formation of a composite mixture with long fibers improves thermal properties as typically represented by load deformation temperature (HDT). Among others, a polyolefin resin is especially preferable because it is low in cost and industrially and economically excellent from the point of view of recycling. Polyolefin resins will therefore be described in detail below.

Polyolefin resins applicable in the invention include monomers such as ethylene, propylene, butene and 4-methylpentene, and further, random, alternate, block and graft copolymers of these monomers with polar monomers such as vinyl acetate, acrylic acid, ester acrylate and maleic anhydride. These polymers include a composition added with a synthetic rubber such as an ethylene-α-olefin-based copolymer rubber, isoprene rubber, or isobutylene rubber in an amount of under 50 wt. %. More specifically, applicable ones include high pressure process ethylene monomers, high pressure process ethylene-porpylene copolymers, low pressure process ethylene monomers, low pressure process ethylene-propylene copolymers, low pressure process ethylene-1-butene copolymers, low pressure process ethylene-1-hexene copolymers, medium pressure process ethylene copolymers, high pressure process ethylene-vinyl acetate copolymers, and propylene-ethylene random or block copolymers.

From among the aforesaid polyolefin resins, a crystalline propylene polymer or particularly polypropylene is preferable. Propylene may be, apart from propylene monomer, a copolymer containing propylene as a main component and an ethylene component, such as a propylene-ethylene block copolymer, or a block copolymer of propylene and ethylene-propylene rubber.

(Kind of conductive material and amount of addition thereof)

There is no particular restriction on the conductive material used in the invention. Any of organic conductive materials, carbon, metals, and other inorganic materials, or a mixture thereof may be used. While any shape may be employed, a powdery or fibrous material is generally suitably applicable. Preferable ones among these applicable materials include conductive carbon black powder, stainless steel powder, carbon fiber, metal-plated carbon fiber, and metal fiber.

The conductive carbon black is, for example, furnace black or acetylene black. Conductive carbon black such as furnace black or acetylene black has a high volume resistivity within a range of from $10^0$ to $10^2$ Ωcm. When using a high-strength conductive resin formed product based on this conductive material for an IC chip tray, it displays excellent performance in terms of electrostatic dissipation. Furnace black is manufactured by burning crude oil by the furnace type incomplete combustion process, and for example, Vulcan XC-72 or Ketchen Black EC (commercial product names) is applicable. In the present invention, furthermore, a formed product having a satisfactory conductivity is available by adding conductive carbon preferably in an amount within a range of from 5 to 40 wt. %, or more preferably, from 8 to 25 wt. % to the high-strength conductive resin formed product.

Carbon fiber materials are broadly classified into two categories: PAN-based and pitch-based ones, both being excellent in conductivity with a volume resistivity within a range of from $10^{-4}$ to $10^{-3}$ Ω·cm. Any carbon fiber can be used in the present invention, and graphitized carbon fiber can also suitably used.

Metal-plated carbon fiber is available by plating a metal onto PAN-based or pitch-based carbon fiber. Carbon fiber plated with a conductive metal such as nickel is useful for uses requiring electromagnetic wave shielding property because of a low volume resistivity.

Applicable fibers include, for example, stainless steel fiber, brass fiber and copper fiber, and ones manufactured by the pullout process or the Vivili process are suitably applicable.

Because a metal fiber such as stainless steel fiber, brass fiber and copper fiber or a carbon fiber plated with a metal such as nickel can always impart a very high conductivity by adding only a slight amount to a thermoplastic resin, these materials are fibrous conductive materials indispensable for a low-resistance resin composite material serving as an electromagnetic wave shielding material. When any of these materials or a carbon fiber is used in the present invention, it should preferably be contained in an amount within a range of from 3 to 60 wt. % in the high-strength conductive resin formed product, or more preferably, from 3 to 50 wt. %.

In order for a high-strength conductive resin formed product to have electromagnetic wave shielding property (EMI shieldability), in the case of stainless steel fiber, the formed product should preferably have a content of at least 7 wt. %, and in the case of carbon fiber, a content of at least 10 wt. %. In the case of a metal fiber obtained by the Vivili process, in order to obtain EMI shieldability, the high-strength conductive resin formed product of the invention should preferably have a content of at least 15 wt. %.

For the purpose of achieving uniform dispersion in the formed product, the foregoing fibrous conductive material should preferably be previously formed into pellets comprising a composite mixture with a resin and used as a master batch. Particularly, carbon black powder is a conductive material hard to handle because it has a small density and tends to easily float. It should therefore preferably be made into resin pellets containing carbon black and dry-blended with resin pellets containing glass fibers into a forming material. Pellets prepared by treating a metal fiber bundle with a converging agent and cutting, or resin pellets containing metal fibers kneaded therein have a large specific gravity. Therefore, when a forming material is prepared by dry-blending with resin pellets containing long glass fibers, separation is caused by the difference in specific gravity. It is thus desirable to adopt a method comprising blending the materials on the forming apparatus and then injecting the blended materials into the forming apparatus.

(Glass-fiber-containing thermoplastic resin (A) and manufacturing method thereof)

As a raw material for the high-strength conductive thermoplastic resin formed product of the present invention, it is desirable to use a thermoplastic resin containing long glass fibers. Such a glass-fiber-containing thermoplastic resin (A) may be manufactured by any process so far as it contains glass fibers having a weight average fiber length of at least 1 mm in an amount within a range of from 10 to 90 wt. %, and the glass fibers are impregnated substantially with the resin. The glass-fiber-containing thermoplastic resin (A) should preferably be in the form of pellets, and suitably applied as a master batch.

With a glass fiber content of under 10 wt. %, the glass-fiber-containing thermoplastic resin (A) cannot fully display advantages of the master batch, resulting in economic disadvantages, and the range of glass content in the high-strength conductive resin formed product becomes tighter. A glass fiber content of over 90 wt. % does not permit sufficient impregnation with resin and makes it very difficult to accomplish manufacture. The glass fiber content should therefore preferably be within a range of from 10 to 75 wt. %, or more preferably, from 15 to 65 wt. %.

Further, pellets of the glass-fiber-containing thermoplastic resin (A) is available in the form of pellets by, for example, impregnating the continuous glass fiber bundle with the thermoplastic resin and cutting the same to a fiber direction length of at least 1 mm. This method, which is low in cost industrially, is preferable. There is no particular restriction on the cutting process. It is however desirable to cut the same substantially at right angles to the fiber direction. The pellet length should preferably be within a range of from 1 to 150 mm. More specifically, a pellet length of under 1 mm renders the weight average fiber length remaining in the high-strength conductive resin formed product of the invention too short, resulting in a smaller contribution of the glass fibers to strength properties. With a pellet length of over 150 mm, the reinforcing effect brought about by the long glass fibers becomes less remarkable, causing clogging in the hopper upon injection molding, or uneven distribution relative to the conductive-material-containing master pellet and other resin pellets. Taking account of the easiness of operation and the effects of the invention, the pellet length should preferably be within a range of from 2 to 150 mm.

The glass fiber bundle may be impregnated with the resin by any process so far as the glass fibers are substantially impregnated with the resin. Applicable processes include a process comprising the steps of impregnating the glass fiber bundle with the resin, and after deposition of a coating, drying the same; a process of depositing a powder suspension of a thermoplastic resin onto the glass fibers, and after drying, carrying out heating, melting and impregnation; a process of charging the glass fibers, causing the thermoplastic resin powder to adhere, and then carrying out heating, melting and impregnation; a process of impregnating the glass fibers with the thermoplastic resin dissolved in a solvent, and then removing the solvent; a process of heating a mixed fibers of continuous fibers of the thermoplastic resin and glass continuous fibers, and impregnating the glass continuous fibers with the molten thermoplastic resin; and a process based on the so-called "pullout process" of impregnating by pulling out the glass fiber bundle through the molten thermoplastic resin. Among others, the pullout process can be suitably applied because of the possibility to fill glass fibers at a very high density, and satisfactory impregnation of the glass fibers with the thermoplastic resin.

More particularly, the pullout process ensures complete impregnation with polyolefin by pulling a glass fiber bundle consisting of from several thousands to several tens of thousand of filaments while opening the fibers on a bar, a roll or a die, and pulling out the bundle through a heated and melted thermoplastic resin. Examples of this process are disclosed in the U.S. Pat. Nos. 4,479,998, 4,549,920 and 4,559,262.

The glass-fiber-containing master batch used in the invention should preferably be manufactured by the aforesaid pullout process from the industrial point of view. That is, a glass-fiber-containing master batch suitable for the invention is available by conducting impregnation by the pullout process, and cutting into a length of at least 1 mm in the fiber length direction. In the thus obtained pellets, glass fibers are present with substantially the same length as that of the pellets, and are arranged substantially in parallel with each other.

(High-strength conductive resin formed product)

The present invention provides a high-strength conductive thermoplastic resin formed product containing glass fiber having a length of at least 0.4 mm in an amount within a range of from 5 to 60 wt. % and at least a kind of conductive material in an amount within a range satisfying the following formula:

$$0.25 \le \sum_{k=1}^{k=n}\left\{\frac{W_k}{|\log E_k|}\right\} \le 50 \qquad \text{Formula (1)}$$

where, $W_k$ is the content in weight of each conductive material (%), $E_k$ is volume resistivity of each conductive material ($\Omega \cdot cm$), and n is the number of kinds of conductive material.

In the glass-fiber-reinforced conductive resin formed products of the conventional art, glass fibers are short ones having a weight average fiber length of up to 0.2 mm in most cases, and even when longer fibers remain, non-uniform distribution of glass fibers in non-uniform strength of the resultant formed products.

According to studies carried out by the present inventors, a remarkable reinforcing effect is observed with a glass fiber length of over 0.4 mm as compared with that of up to 0.2 mm, and more remarkably, with a glass fiber length of at least 0.8 mm, and furthermore remarkably, with a glass fiber length of at least 1.2 mm.

The formed product of the present invention must contain glass fibers longer than 0.4 mm in an amount within a range of from 5 to 60 wt. %. In other words, while a content of glass fibers having a length of at least 0.4 mm in an amount of at least 5 wt. % exhibits a remarkable reinforcing effect, a content of over 60 wt. % reduces fluidity during melting, thus making it difficult to conduct forming fabrication or resulting in a defective exterior view of the formed product. The glass fiber content should therefore preferably be within a range of from 10 to 50 wt. %.

The formed product of the invention contains at least a kind of the aforesaid conductive material, irrespective of the shape thereof. Preferable conductive materials include carbon black (carbon powder), metal powder such as stainless steel powder, carbon fiber, carbon fiber plated with a metal such as nickel, and metal fibers such as stainless steel fiber, brass fiber and copper fiber.

For the formed product of the invention, the balance between required conductivity and mechanical strength varies with particular uses. Among others, conductive performance depends upon the content of the conductive material and volume resistivity thereof. It is therefore essential for each conductive material that the sum of values obtained by dividing the content of each conductive material by the absolute value of logarithm of the volume resistivity of the conductive material. In particular, the lower limit value of the formula (1) should preferably be 0.1, and the upper limit value, 30. In the present invention, it is possible to avoid specification-over of the formed product, and to ensure full display of conductivity performance and strength optimum for the use by appropriately combining long glass fibers and the conductive materials within the above-mentioned range of conditions.

For the other parameters such as the kind of thermoplastic resin, the kind of glass fibers and the coupling agent composing the formed product, the conditions as described above are applied as they are as being preferable.

The thermoplastic resin formed product of the invention suffices to satisfy the foregoing conditions, and may be manufactured by any method.

In an preferred embodiment, with glass-fiber-containing thermoplastic resin pellets having a weight average fiber length of at least 1 mm as a master batch, the mixture is employed as a forming material containing a conductive material, or a blend comprising a master batch including the conductive material. At this point, a converging agent may be used on condition that the converging agent does not cause a decrease in properties of the thermoplastic resin serving as the matrix of the conductive material. Injection molding, or injection-compression molding is suitably used for forming the forming material containing the blend.

The forming material, the formed product and the manufacturing method thereof of the invention have been described above. The forming material and the formed product may contain any of various additives in addition to the thermoplastic resin, the glass fibers and the conductive material mentioned above. Examples of such additives include an oxidation inhibitor, a fire retardant, a combustion resistant agent, a filler, a reinforcing material, and an antistatic agent. Particularly, preferable fillers and reinforcing materials include mica, talc, titanate whisker and warrastnite, as well as glass fiber shorter than 0.2 mm, glass beads, glass flake and milled glass.

EXAMPLES

The present invention will now be described further in detail by means of examples.

In the examples and comparative examples presented below, three kinds of pellets including a thermoplastic resin pellet containing long glass fibers, a thermoplastic resin pellet containing short glass fibers, and a thermoplastic resin pellet containing a conductive material were manufactured by the following methods, respectively, and a thermoplastic resin material prepared by mixing these kinds of pellet was formed by injection molding to obtain test pieces.

Thermoplastic resin pellets containing long glass fibers:

Verton MFX700-10 (made by Kawasaki Steel Corp.) was used as a long-glass-fiber-reinforced polypropylene pellet, and Verton RF700-10 (made by Kawasaki Steel US LNP) was used as a long-glass-fiber-reinforced 6,6-nylon pellet. A glass fiber bundle (glass fiber monofilament, diameter: 13 $\mu$m) was impregnated with each heated and melted thermoplastic resin while opening the fibers, and after cooling, was cut into pellets having a length of 9 mm, i.e., by the application of a process known as the pullout process. The kind of thermoplastic resin used, the glass fiber content in the resultant pellets and the glass fiber length are shown in Table 1. Observation of the resultant pellets with soft X-rays revealed that, in a pellet, glass fibers were arranged substantially in parallel with each other, and the glass fiber had the same length as that of the pellets.

Manufacturing method of short-glass-fiber-reinforced thermoplastic resin pellets:

Thermoplastic resin pellets and chop-shaped glass fibers (glass fiber monofilament, diameter: 16 $\mu$m, length: 15 mm) were melted, kneaded and extruded by means of a biaxial extruder (TEX30X, L/D=42, made by Nihon Seiko Co.), thereby obtaining pellets having a length of 3 mm. The kind of thermoplastic resin used, the glass fiber content in the resultant pellets, and the glass fiber length are shown in Table 1. Homo-type Melt-Florate was used in an amount of 40 g/10 min as polypropylene, and Seidel 101 (made by Du Pont) was used as 6,6-nylon. Cylinder temperature of the extruder was 210° C. for polypropylene, 180° C. for polystyrene, 300° C. for 6,6-nylon, and 250° C. for 6-nylon.

Manufacturing method of conductive pellets:

Thermoplastic resin pellets and a conductive material were melted, kneaded and extruded by means of a biaxial extruder (TEX30X, L/D=42, made by Nihon Seiko Co.), thereby obtaining pellets having a length of 3 mm. The kind of thermoplastic resin and conductive material used, and the conductive material content in the resultant pellets are shown in Table 1. Homo-type Melt-Florate was used in an amount of 40 g/10 min as polypropylene, and Seidel 101 (made by Du Pont) was used as 6,6-nylon. The cylinder temperature of the extruder was 210° C. for polypropylene, and 300° C. for 6,6-nylon.

Examples 1 to 10 and Comparative Examples 1 to 10

The pellets manufactured as above were dry-mixed at ratios shown in Tables 2 to 5 and injection-molded (with a mold tightening force: 50 tons), thereby obtaining test pieces for tensile, bending and Izod (with notch) tests in conformity to ASTM Standard. The thermoplastic resin forming materials of Examples 1 to 10 were mixtures of long-glass-fiber-reinforced thermoplastic resin pellets and conductive pellets. Those of Comparatives Examples 1 to 10 were mixtures of short-glass-fiber-reinforced thermoplastic resin pellets and conductive pellets. The injection molding temperature was 240° C. for polypropylene, 250° C. for 6-nylon, and 280° C. for 6,6-nylon. The mold temperature was 60° C. for polypropylene, 70° C. for polystyrene, and 100° C. for 6-nylon and 6,6-nylon.

In the performance test, mechanical strength, thermal deformation temperature and surface resistance were measured in conformity to ASTM. The weight average glass fiber length (1w) was measured with the use of a magnifying glass after baking the formed product at 600° C., and then calculated in accordance with a formula: $1w=\Sigma(wi \times li)/\Sigma wi$ (where, wi is the glass fiber weight, and li is the glass fiber length). The results obtained are shown in Tables 2 to 5, together with blending ratio of the individual pellets.

As shown in Tables 2 to 5, the formed product of the invention is conductive, and excellent in any of mechanical strength properties represented by tensile strength, bending strength, modulus of bending elasticity and Izot impact value. Further, the formed product of the invention has a high thermal deformation temperature and is excellent in thermal resistance.

TABLE 1

|  | Kind of resin | Glass fiber* Qt. of addition (wt. %) | Glass fiber length** (mm) | Kind of conductive material | Volume resistivity of conductive material ($\Omega$cm) | Conductive material*** Qt. of addition (wt. %) |
|---|---|---|---|---|---|---|
| Long fiber pellet 1 | Polypropylene | 50 | 9 | None |  | 0 |
| Long fiber pellet 2 | Syndiotactic polystyrene | 50 | 9 | None |  | 0 |
| Long fiber pellet 3 | 6-nylon | 50 | 9 | None |  | 0 |
| Long fiber pellet 4 | 6,6-nylon | 50 | 9 | None |  | 0 |
| Short fiber pellet 1 | Polypropylene | 50 | 0.1 | None |  | 0 |
| Short fiber pellet 2 | Syndiotactic polystyrene | 50 | 0.1 | None |  | 0 |
| Short fiber pellet 3 | 6-nylon | 50 | 0.1 | None |  | 0 |
| Short fiber pellet 4 | 6,6-nylon | 50 | 0.1 | None |  | 0 |
| Conductive pellet 1 | Polypropylene | 0 | — | Carbon black average particle dia.: 30 $\mu$m (Ketchen black EC) | $2.3 \times 10^{-2}$ | 30 |
| Conductive pellet 2 | Polypropylene | 0 | — | Carbon black average particle dia.: 30 $\mu$m (Vulcan XC 72) | $3.2 \times 10^{-2}$ | 30 |
| Conductive pellet 3 | Polypropylene | 0 | — | Stainless steel fiber (fiber dia.: 10 $\mu$m; length: 9 mm) | $9.7 \times 10^{-6}$ | 30 |
| Conductive pellet 4 | Polypropylene | 0 | — | Carbon fiber Toray Besfite C6-S (fiber dia.: 10 $\mu$m; length: 9 mm) | $1.5 \times 10^{-3}$ | 40 |
| Conductive pellet 5 | Polypropylene | 0 | — | Carbon black average particle dia.: 30 $\mu$m (Ketchen black EC) | $2.3 \times 10^{-2}$ | 30 |
| Conductive pellet 6 | 6,6-nylon | 0 | — | Carbon fiber Toray Besfite C6-N (fiber dia.: 10 $\mu$m; length: 9 mm) | $1.5 \times 10^{-3}$ | 40 |
| Conductive pellet 7 | Syndiotactic polystyrene | 0 | — | Copper fiber (fiber dia.: 10 $\mu$m; length: 9 mm) | $1.6 \times 10^{-6}$ | 30 |
| Conductive pellet 8 | 6-nylon | 0 | — | Carbon fiber Toray Besfite C6-N (fiber dia.: 10 $\mu$m; length: 9 mm) | $1.5 \times 10^{-3}$ | 40 |
| Conductive pellet 9 | 6-nylon | 0 | — | Nickel-plated carbon fiber (fiber dia.: 10 $\mu$m, length: 9 mm) | $3.2 \times 10^{-4}$ | 30 |
| Conductive pellet 10 | 6,6-nylon | 0 | — | Brass fiber (fiber dia.: 10 $\mu$m; length: 9 mm) | $11.5 \times 10^{-6}$ | 30 |

*: Content in glass long fiber pellet or glass short fiber reinforced pellet
**: Weight average fiber length of glass long fiber pellet or glass short fiber reinforced pellet
***: Content in conductive pellet

TABLE 2

|  |  | Example 1 | Example 2 | Example 3 | Comparative Example 1 | Comparative Example 2 | Comparative Example 3 |
|---|---|---|---|---|---|---|---|
| Blend composition (weight parts) | Long fiber pellet 1 | 50 | 40 | 65 | — | — | — |
|  | Long fiber pellet 2 | — | — | — | — | — | — |
|  | Long fiber pellet 3 | — | — | — | — | — | — |
|  | Long fiber pellet 4 | — | — | — | — | — | — |
|  | Short fiber pellet 1 | — | — | — | 50 | 40 | 65 |
|  | Short fiber pellet 2 | — | — | — | — | — | — |
|  | Short fiber pellet 3 | — | — | — | — | — | — |
|  | Short fiber pellet 4 | — | — | — | — | — | — |
|  | Conductive pellet 1 | 50 | — | — | 50 | — | — |
|  | Conductive pellet 2 | — | 60 | — | — | 60 | — |
|  | Conductive pellet 3 | — | — | 35 | — | — | 35 |
|  | Conductive pellet 4 | — | — | — | — | — | — |
|  | Conductive pellet 5 | — | — | — | — | — | — |
|  | Conductive pellet 6 | — | — | — | — | — | — |
|  | Conductive pellet 7 | — | — | — | — | — | — |
|  | Conductive pellet 8 | — | — | — | — | — | — |
|  | Conductive pellet 9 | — | — | — | — | — | — |
|  | Conductive pellet 10 | — | — | — | — | — | — |

TABLE 2-continued

|  |  |  | Example 1 | Example 2 | Example 3 | Comparative Example 1 | Comparative Example 2 | Comparative Example 3 |
|---|---|---|---|---|---|---|---|---|
| Result of evaluation | Tensile strength (kgf/cm$^2$) | D638 | 828 | 776 | 920 | 342 | 305 | 257 |
|  | Bending strength (kgf/cm$^2$) | D790 | 1320 | 1150 | 1740 | 430 | 418 | 342 |
|  | Modulus of bending elasticity (kgf/cm$^2$) | D790 | 65000 | 55000 | 107000 | 36500 | 35450 | 31000 |
|  | Izod impact value (kgf · cm/cm) with notch | D256 | 18 | 21 | 24 | 11 | 11 | 9 |
|  | Thermal deformation temp.(° C.) 18.6 kgf/cm$^2$ | D648 | 156 | 156 | 158 | 106 | 110 | 104 |
|  | Surface resistance (Ω/cm$^2$) | D257 | 1000 | 1000 | 0.1 | 1000 | 1000 | 0.1 |
|  | Weight average glass fiber length (mm) |  | 2 | 1.4 | 1.2 | 0.6 | 0.04 | 0.06 |
|  | Glass fiber of over 0.4 mm (wt. %) |  | 23.75 | 18 | 29.25 | — | — | — |

TABLE 3

|  |  |  | Example 4 | Example 5 | Example 6 | Example 7 |
|---|---|---|---|---|---|---|
| Blend composition (weight parts) | Long fiber pellet 1 |  | — | — | — | — |
|  | Long fiber pellet 2 |  | 70 | — | — | — |
|  | Long fiber pellet 3 |  | — | 50 | 70 | — |
|  | Long fiber pellet 4 |  | — | — | — | 70 |
|  | Short fiber pellet 1 |  | — | — | — | — |
|  | Short fiber pellet 2 |  | — | — | — | — |
|  | Short fiber pellet 3 |  | — | — | — | — |
|  | Short fiber pellet 4 |  | — | — | — | — |
|  | Conductive pellet 1 |  | — | — | — | — |
|  | Conductive pellet 2 |  | — | — | — | — |
|  | Conductive pellet 3 |  | — | — | — | — |
|  | Conductive pellet 4 |  | — | — | — | — |
|  | Conductive pellet 5 |  | — | — | — | — |
|  | Conductive pellet 6 |  | — | — | — | — |
|  | Conductive pellet 7 |  | 30 | — | — | — |
|  | Conductive pellet 8 |  | — | 50 | — | — |
|  | Conductive pellet 9 |  | — | — | 30 | — |
|  | Conductive pellet 10 |  | — | — | — | 30 |
| Result of evaluation | Tensile strength (kgf/cm$^2$) | D638 | 828 | 4200 | 4200 | 2100 |
|  | Bending strength (kgf/cm$^2$) | D790 | 1320 | 5200 | 5200 | 3200 |
|  | Modulus of bending elasticity (kgf/cm$^2$) | D790 | 65000 | 100000 | 100000 | 110000 |
|  | Izod impact value (kgf · cm/cm) with notch | D256 | 20 | 21 | 24 | 20 |
|  | Thermal deformation temp.(° C.) 18.6 kgf/cm$^2$ | D648 | 130 | 257 | 257 | 280 |
|  | Surface resistance (Ω/cm$^2$) | D257 | 0.1 | 0.001 | 0.1 | 0.1 |
|  | Weight average glass fiber length (mm) |  | 2 | 1.2 | 0.8 | 1.2 |
|  | Glass fiber of over 0.4 mm (wt. %) |  | 33.25 | 22.5 | 30.8 | 31.5 |

TABLE 4

|  |  |  | Comparative Example 4 | Comparative Example 5 | Comparative Example 6 | Comparative Example 7 |
|---|---|---|---|---|---|---|
| Blend composition (weight parts) | Long fiber pellet 1 |  | — | — | — | — |
|  | Long fiber pellet 2 |  | — | — | — | — |
|  | Long fiber pellet 3 |  | — | — | — | — |
|  | Long fiber pellet 4 |  | — | — | — | — |
|  | Short fiber pellet 1 |  | — | — | — | — |
|  | Short fiber pellet 2 |  | 70 | — | — | — |
|  | Short fiber pellet 3 |  | — | 50 | 70 | — |
|  | Short fiber pellet 4 |  | — | — | — | 70 |
|  | Conductive pellet 1 |  | — | — | — | — |
|  | Conductive pellet 2 |  | — | — | — | — |
|  | Conductive pellet 3 |  | — | — | — | — |
|  | Conductive pellet 4 |  | — | — | — | — |
|  | Conductive pellet 5 |  | — | — | — | — |
|  | Conductive pellet 6 |  | — | — | — | — |
|  | Conductive pellet 7 |  | 30 | — | — | — |
|  | Conductive pellet 8 |  | — | 50 | — | — |
|  | Conductive pellet 9 |  | — | — | 30 | — |
|  | Conductive pellet 10 |  | — | — | — | 30 |
| Result of evaluation | Tensile strength (kgf/cm$^2$) | D638 | 550 | 1200 | 1800 | 1100 |
|  | Bending strength (kgf/cm$^2$) | D790 | 980 | 2500 | 3200 | 1500 |
|  | Modulus of bending elasticity (kgf/cm$^2$) | D790 | 57000 | 78000 | 75800 | 817000 |
|  | Izod impact value (kgf · cm/cm) with notch | D256 | 5 | 7 | 8 | 7 |
|  | Thermal deformation temp.(° C.) 18.6 kgf/cm$^2$ | D648 | 102 | 220 | 220 | 250 |
|  | Surface resistance (Ω/cm$^2$) | D257 | 0.1 | 0.001 | 0.1 | 0.1 |
|  | Weight average glass fiber length (mm) |  | 0.05 | 0.04 | 0.04 | 0.05 |

TABLE 5

| | | | Example 8 | Example 9 | Example 10 | Comparative Example 8 | Comparative Example 9 | Comparative Example 10 |
|---|---|---|---|---|---|---|---|---|
| Blend composition (weight parts) | Long fiber pellet 1 | | 50 | — | — | — | — | — |
| | Long fiber pellet 2 | | — | — | — | — | — | — |
| | Long fiber pellet 3 | | — | — | — | — | — | — |
| | Long fiber pellet 4 | | — | 50 | 40 | — | — | — |
| | Short fiber pellet 1 | | — | — | — | 50 | — | — |
| | Short fiber pellet 2 | | — | — | — | — | — | — |
| | Short fiber pellet 3 | | — | — | — | — | — | — |
| | Short fiber pellet 4 | | — | — | — | — | 50 | 40 |
| | Conductive pellet 1 | | — | — | — | — | — | — |
| | Conductive pellet 2 | | — | — | — | — | — | — |
| | Conductive pellet 3 | | — | — | — | — | — | — |
| | Conductive pellet 4 | | 50 | — | — | 50 | — | — |
| | Conductive pellet 5 | | — | 50 | — | — | 50 | — |
| | Conductive pellet 6 | | — | — | 60 | — | — | 60 |
| | Conductive pellet 7 | | — | — | — | — | — | — |
| | Conductive pellet 8 | | — | — | — | — | — | — |
| | Conductive pellet 9 | | — | — | — | — | — | — |
| | Conductive pellet 10 | | — | — | — | — | — | — |
| Result of evaluation | Tensile strength (kgf/cm$^2$) | D638 | 1251 | 1700 | 2390 | 575 | 900 | 1673 |
| | Bending strength (kgf/cm$^2$) | D790 | 2025 | 2450 | 3460 | 730 | 1250 | 2422 |
| | Modulus of bending elasticity (kgf/cm$^2$) | D790 | 140000 | 90100 | 140000 | 100000 | 65000 | 119000 |
| | Izod impact value (kgf · cm/cm) with notch | D256 | 22 | 18 | 18 | 9 | 4 | 8 |
| | Thermal deformation temp.(° C.) 18.6 kgf/cm$^2$ | D648 | 158 | 248 | 250 | 132 | 235 | 245 |
| | Surface resistance (Ω/cm$^2$) | D257 | 1000 | 10000 | 1000 | 1000 | 10000 | 1000 |
| | Weight average glass fiber length (mm) | | 2.1 | 1.6 | 0.8 | 0.06 | 0.05 | 0.05 |
| | Glass fiber of over 0.4 mm (wt. %) | | 23.75 | 23.25 | 16 | — | — | — |

TABLE 6

| | | | Example 11 | Example 12 | Example 13 | Comparative Example 11 | Comparative Example 12 | Comparative Example 13 |
|---|---|---|---|---|---|---|---|---|
| Blend composition (weight parts) | Long fiber pellet 1 | | 40 | 30 | — | — | — | — |
| | Long fiber pellet 2 | | — | — | — | — | — | — |
| | Long fiber pellet 3 | | — | — | — | — | — | — |
| | Long fiber pellet 4 | | — | — | 30 | — | — | — |
| | Short fiber pellet 1 | | — | — | — | 40 | 30 | — |
| | Short fiber pellet 2 | | — | — | — | — | — | — |
| | Short fiber pellet 3 | | — | — | — | — | — | — |
| | Short fiber pellet 4 | | — | — | — | — | — | 30 |
| | Conductive pellet 1 | | — | 30 | — | — | 30 | — |
| | Conductive pellet 2 | | — | — | — | — | — | — |
| | Conductive pellet 3 | | 20 | — | — | 20 | — | — |
| | Conductive pellet 4 | | 30 | 30 | — | 30 | 30 | — |
| | Conductive pellet 5 | | — | — | — | — | — | — |
| | Conductive pellet 6 | | — | — | — | — | — | — |
| | Conductive pellet 7 | | — | — | — | — | — | — |
| | Conductive pellet 8 | | — | — | 30 | — | — | 30 |
| | Conductive pellet 9 | | — | — | — | — | — | — |
| | Conductive pellet 10 | | — | — | 40 | — | — | 40 |
| Result of evaluation | Tensile strength (kgf/cm$^2$) | D638 | 1200 | 1050 | 2250 | 750 | 680 | 1850 |
| | Bending strength (kgf/cm$^2$) | D790 | 2100 | 1950 | 3600 | 1650 | 1200 | 2900 |
| | Modulus of bending elasticity (kgf/cm$^2$) | D790 | 135000 | 112000 | 145000 | 100000 | 87000 | 11000 |
| | Izod impact value (kgf · cm/cm) with notch | D256 | 22 | 18 | 23 | 6 | 4 | 8 |
| | Thermal deformation temp.(° C.) 18.6 kgf/cm$^2$ | D648 | 158 | 158 | 245 | 132 | 122 | 241 |
| | Surface resistance (Ω/cm$^2$) | D257 | 10 | 100 | 1 | 10 | 100 | 1 |
| | Weight average glass fiber length (mm) | | 1.4 | 1.6 | 0.8 | 0.06 | 0.05 | 0.05 |
| | Glass fiber of over 0.4 mm (wt. %) | | 16 | 12 | 11 | — | — | — |

Industrial Applicability

According to the present invention, there is available a long-glass-fiber-reinforced thermoplastic resin formed product superior in mechanical strength to that in the conventional art and having conductivity. The formed product of the invention has furthermore an advantage of permitting mass production of a complicated shape product at a low cost through injection molding or injection-compression molding. The formed product of the invention is therefore widely applicable in place of conventional products such as metal-fabricated and surface conductive-treated products in the areas of electromagnetic wave shielding materials such as housings and enclosures of electronic circuits and conductive materials such as IC chip trays and electrostatic dissipating materials.

What is claimed is:

1. A thermoplastic resin formed product comprising glass fiber having a length of at least 0.4 mm in an amount within a range of from 5 to 60 wt % and at least a kind of conductive material in an amount within a range satisfying the following formula (1):

$$0.25 \leq \sum_{k=1}^{k=n} \left\{ \frac{W_k}{|\log E_k|} \right\} \leq 50 \qquad \text{Formula (1)}$$

wherein, $W_k$ is the content in weight percentage of each conductive material $E_k$ is the volume resistivity of each conductive material ($\Omega \cdot$cm), and n is the number of kinds of conductive material.

2. A thermoplastic resin formed product according to claim 1, wherein said thermoplastic resin is at least one selected from the group consisting of polyolefin resin, polyamide resin, polystyrene resin and ABS resin.

3. A thermoplastic resin formed product according to claim 1, wherein said conductive material is at least one selected from the group consisting of carbon black, carbon fiber, stainless steel fiber and copper fiber.

4. A thermoplastic resin formed product according to claim 1, wherein said glass fiber is coupling-treated, and has a diameter within a range of from 5 to 35 μm.

5. A thermoplastic resin formed product according to claim 1, wherein said conductive material is carbon black, contained in an amount within a range of from 5 to 40 wt. % in said formed product.

6. A thermoplastic resin formed product according to claim 1, wherein the a lower limit value of said formula (1) is 1.0, and an upper limit value thereof is 30.

7. A thermoplastic resin formed product according to claim 1, wherein said formed product is obtained by an injection molding process or an injection-compression molding process.

8. A method of manufacturing a thermoplastic resin formed product, comprising the step of forming a thermoplastic resin (A) comprising glass fiber having a weight average fiber length of at least 1 mm in an amount within a range of from 10 to 90 wt %, in which the glass fiber is substantially impregnated with the resin, and a material comprising at least one conductive material, while mixing the same or after mixing the same.

9. A method of manufacturing a thermoplastic resin formed product according to claim 8, wherein said thermoplastic resin (A) comprising the glass fiber comprises pellets having a length within a range of from 2 to 150 mm available by impregnating glass fiber bundles with the thermoplastic resin and cutting the same, and the glass fiber has substantially the same length as that of the pellets in which the fibers are arranged substantially in parallel with each other.

10. A method of manufacturing a thermoplastic resin formed product according to claim 8, wherein said material comprising at least one conductive material is a thermoplastic resin (B) comprising at least one conductive material.

11. A method of manufacturing a thermoplastic resin formed product according to claim 8, wherein said thermoplastic resin (A) comprising glass fiber comprises pellets having a length within a range of from 2 to 150 mm available by impregnating glass fiber bundles with the thermoplastic resin and cutting the same, and the glass fiber has substantially the same length as that of the pellets in which said fibers are arranged substantially in parallel with each other; and wherein said material comprising at least one conductive material is a thermoplastic resin (B) comprising at least one conductive material.

12. A method of manufacturing a thermoplastic resin formed product according to claim 8, wherein said thermoplastic resin is at least one selected from the group consisting of polyolefin resin, polyamide resin, polystyrene resin and ABS resin.

13. A method of manufacturing a thermoplastic resin formed product according to claim 8, wherein said conductive material is at least one selected from the group consisting of carbon black, carbon fiber, stainless steel fiber and copper fiber.

14. A method of manufacturing a thermoplastic resin formed product according to claim 8, wherein said glass fiber is coupling-treated, and has a diameter within a range of from 5 to 35 μm.

15. A method of manufacturing a thermoplastic resin formed product according to claim 8, wherein said forming is accomplished by an injection molding process or an injection-compression molding process.

\* \* \* \* \*

UNITED STATES PATENT AND TRADEMARK OFFICE
CERTIFICATE OF CORRECTION

PATENT NO.    : 6,153,683
DATED         : November 28, 2000
INVENTOR(S)   : Norihide Enomoto It is certified that error appears in the above-identified patent and that said Letters Patent is hereby corrected as shown below:

Please insert the following to perfect the claim of foreign priority under 35 U.S.C. §119 (a)-(d):

[30] Foreign Application Priority Data
    November 14, 1996 [JP] Japan.....................................H8-303042

Signed and Sealed this

Fourth Day of September, 2001

*Attest:*

*Attesting Officer*

NICHOLAS P. GODICI
*Acting Director of the United States Patent and Trademark Office*